United States Patent [19]

Karing

[11] 4,098,285

[45] Jul. 4, 1978

[54] DEVICE FOR REGULATING THE DIFFERENTIAL PRESSURE BETWEEN TWO DIFFERENT PRESSURE POINTS OF A FLUID CIRCUIT

[75] Inventor: Paul Karing, Denzlingen, Germany of

[73] Assignee: Bronzavia, Courbevoie, France

[21] Appl. No.: 761,031

[22] Filed: Jan. 21, 1977

[30] Foreign Application Priority Data

Jan. 20, 1976 [FR] France .................. 76 01344

[51] Int. Cl.² .......................................... G05D 13/06
[52] U.S. Cl. ...................................... 137/117; 132/501
[58] Field of Search ................. 137/117, 501, 505.18; 92/95, 6 D

[56] References Cited

U.S. PATENT DOCUMENTS

| | | | |
|---|---|---|---|
| 2,462,983 | 3/1949 | MacDuff et al. | 137/117 |
| 2,950,739 | 8/1960 | Lofink | 92/95 |
| 3,106,934 | 10/1963 | Rogers et al. | 137/501 |
| 3,115,068 | 12/1963 | Lofink | 137/505.18 |
| 3,532,106 | 10/1970 | Greune | 137/117 |

Primary Examiner—William R. Cline
Assistant Examiner—H. Jay Spiegel
Attorney, Agent, or Firm—Sughrue, Rothwell, Mion, Zinn and Macpeak

[57] ABSTRACT

The device comprises a case in which there are provided an inlet orifice connected to the first point of pressure, a fluid return orifice and a passage of variable section interposed between these orifices. A slide valve member is movably mounted in the case for regulating the passage section in accordance with the differential pressure of the two points of pressure, in opposition to the action of an opposing spring. A detecting chamber is provided in the case and connected to the second point of pressure. The detecting chamber is separated from the inlet orifice by a sealing device having a section which varies in accordance with the displacement of the slide valve member and on which sealing device the differential pressure acts.

13 Claims, 8 Drawing Figures

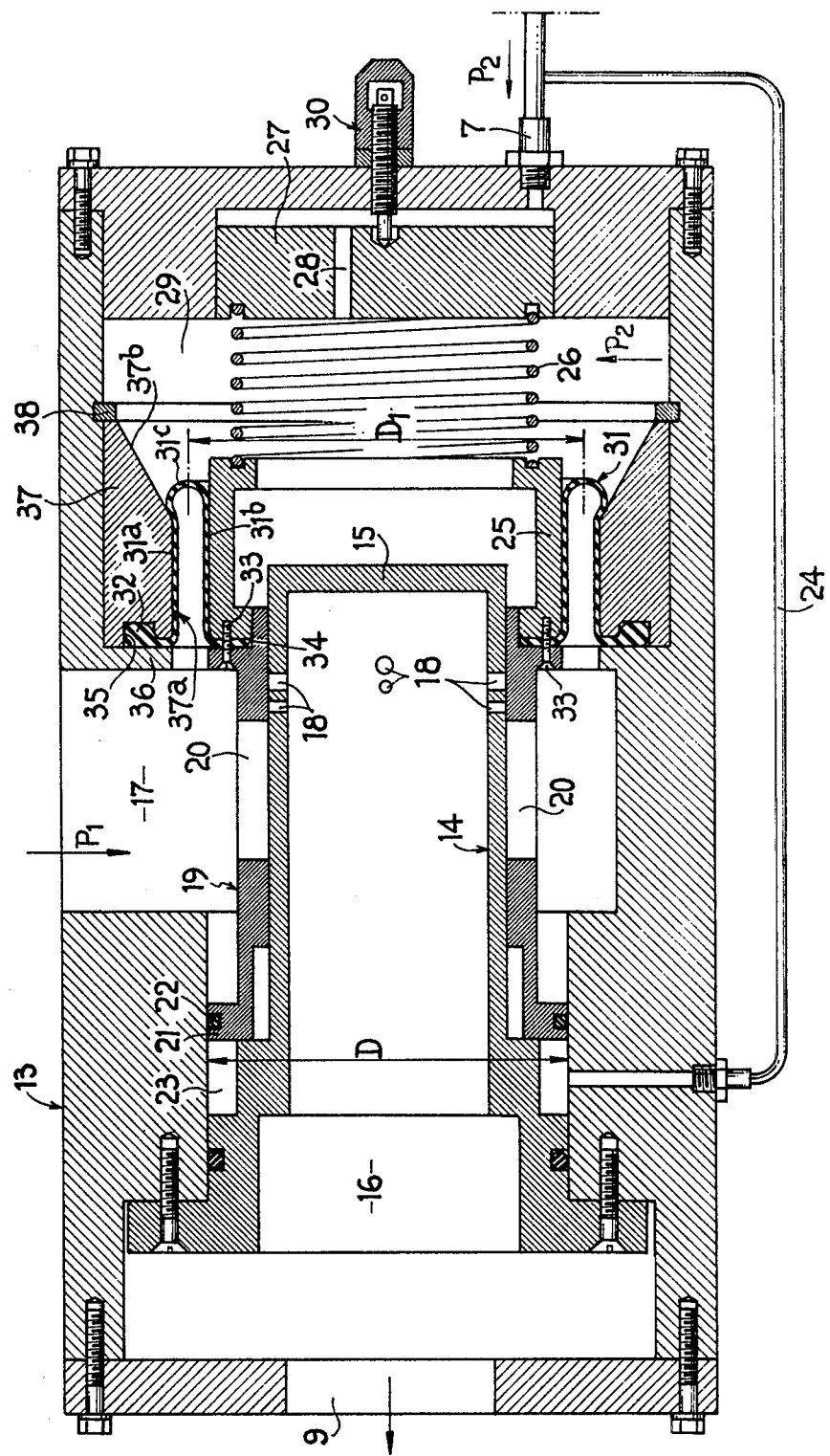

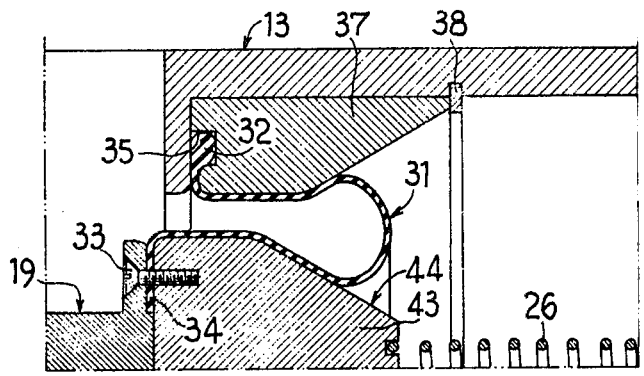
FIG_6A
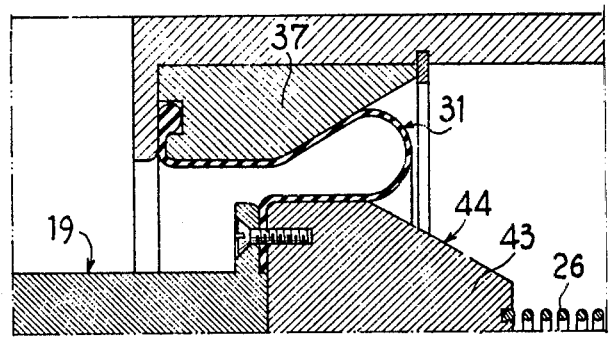
FIG_6B
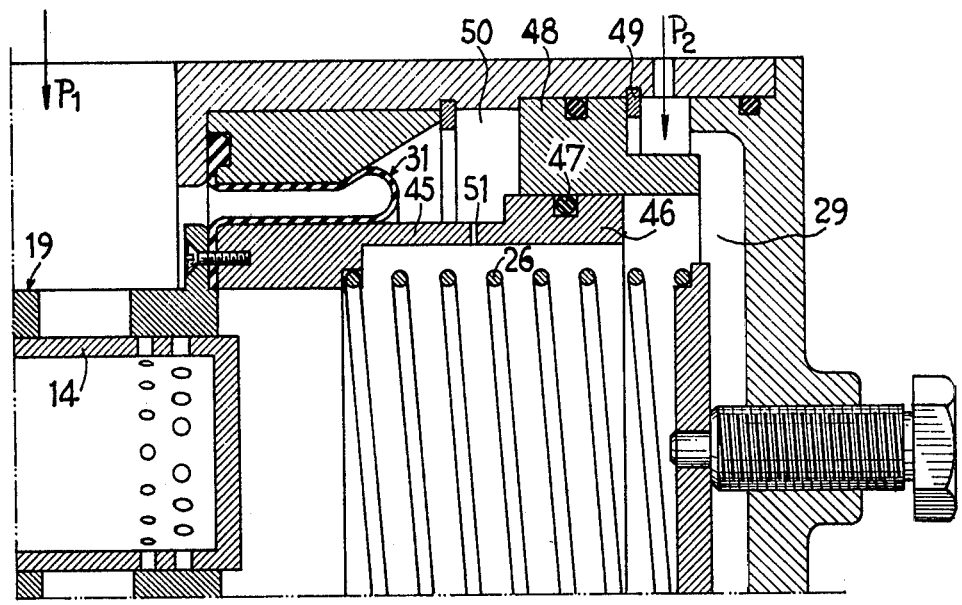
FIG_7

DEVICE FOR REGULATING THE DIFFERENTIAL PRESSURE BETWEEN TWO DIFFERENT PRESSURE POINTS OF A FLUID CIRCUIT

The present invention relates to devices for regulating the flow of a liquid or gaseous fluid, and relates more particularly to a device for imposing a law of variation on a differential pressure between two points of a fluid circuit and, if desired, maintaining this differential pressure constant, as is often desirable for the differential pressure between the inlet and outlet of a flow regulator having a variable orifice. A device of this type permits, for example, the obtainment of a constant flow of utilization of the fluid with an orifice of given section irrespective of the conditions of pressure upstream of the regulator, or the obtainment of a flow which is directly proportional to the variation in the section of the orifice of the regulator. These devices are of use in particular for regulating the flow of the fuel supplied to the burners of a turbo-machine.

In French Pat. No. 1 130 564, such a device has been proposed which has for function to constitute an adjustable feedback of the main flow through the regulator, the excess fluid being returned to the pump supplying the fluid to the fluid circuit. This device comprises a movable slide valve member which, in moving in a sleeve under the action of the pressure of the fluid, on one hand, and of the force of a spring on the other, feeds back a more or less large quantity of fluid as a function of the differential pressure. The device further comprises, for the purpose of compensating for the variation in the force exerted by the spring, which changes as a function of the displacement of the slide valve member, compensating means comprising in particular a jet having an adjustable section.

The device of said patent has given satisfaction, but has drawbacks. For example, in order that the jet be able to operate it must be supplied with fluid by means of an auxiliary flow which produces an imprecision in the main flow, above all if the latter is of small magnitude. Further, the device is sensitive to impurities which, in clogging up the jet, are liable to cause by an "avalanche" effect, the total opening of the defice, which would put the total flow of the fluid in communication with the return circuit. Although this risk is extremely small, owing to the filters which are usually interposed in the stream of fluid, it could nonetheless have an adverse effect on the operational reliability of the device.

An object of the invention is to provide a device of the aforementioned type which is devoid of the aforementioned drawbacks.

According to the invention, there is provided a device for regulating the differential pressure between two points of different pressure of a fluid circuit, comprising a case in which there are provided an inlet orifice connected to the first point of pressure, a fluid return orifice and a passage of variable section interposed between said orifices, a slide valve member movably mounted in said case for regulating said passage as a function of the differential pressure of the two points of pressure in opposition to the action of an opposing spring, and a detecting chamber provided in said case and connected to the second point of pressure, wherein said detecting chamber is separated from said inlet orifice by sealing means having a section which varies as a function of the displacement of said slide valve member and on which sealing means said differential pressure acts.

Owing to these features, it is possible to impose a given law of variation on the differential pressure and, if desired, in a particular arrangement of the sealing means, to maintain this differential pressure constant by an exact compensation for the variation in the force exerted by the spring acting on the slide valve.

Further features of the invention will be apparent from the ensuing description.

In the accompanying drawings, given solely by way of example:

FIG. 2 is an axial sectional view of the device according to the invention;

FIGS. 4, 5, 6A, 6B and 7 are partial sectional views of several modifications which may be made in the device according to the invention.

Figure 1:
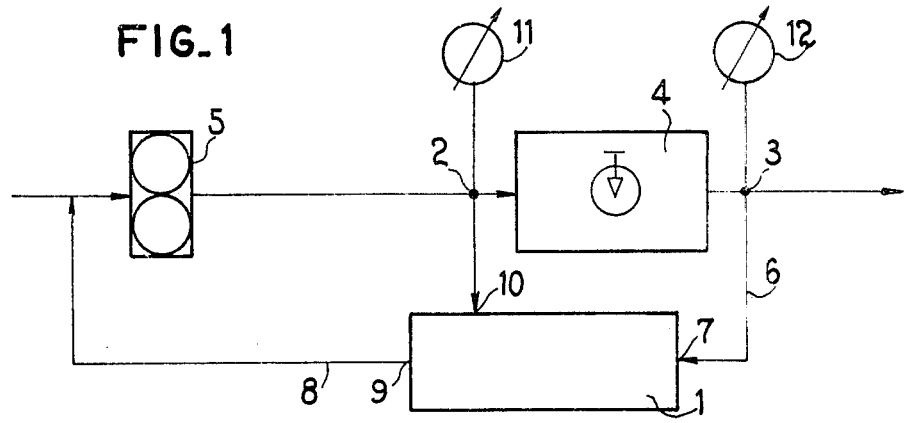
FIG. 1 is a diagram of a fuel supply device for a turbo-machine in which a device according to the invention is incorporated.

In FIG. 1, the rectangle 1 designates a regulating device according to the invention for maintaining constant the pressure drop of a fluid between two points 2 and 3 of a fluid circuit. In the illustrated embodiment, which concerns a fuel supply device for a turbo-machine (not shown), these two points 2 and 3 are respectively the upstream side and downstream side of a device 4 which controls the flow and has an adjustable orifice and is supplied with fluid by a pump 5 and delivers fluid to the injectors (not shown) of the turbo-machine.

The regulating device 1 comprises an adjustable feedback of the main flow owing to the provision of a pipe 6 connected to the point 3 and to the measuring inlet 7 of this device and to a pipe 8 connected between the inlet side of the pump 5 and the return or outlet orifice 9 of the regulating device 1. The latter also comprises an inlet orifice 10 which is connected to the point 2 of the main circuit. The pressure points 2 and 3 are also connected to indicators 11 and 12 which indicate the pressures at the points 2 and 3.

Although in the presently-described embodiment the regulated fluid is a fuel, it is important to note that the device according to the invention may be employed also with other liquid or gaseous fluids the differential pressure of which must be regulated between two points of a circuit in which such a fluid flows.

In FIG. 2 it can be seen that the regulating device 1 comprises means defining a case 13 in which there is mounted a sleeve 14 which is closed at its inner end by a partition wall 15 and defines an outlet chamber 16 which communicates with the return orifice 9 of the device. The outlet chamber 16 may be put in communication with an inlet chamber 17 by way of a series of radial orifices 18 having different sections.

The outer wall of the sleeve 14 constitutes a bearing surface for a slide valve member 19 which is slidably mounted on the sleeve 14 and has a series of ports 20 which are capable of uncovering one or more of the orifices 18 when the slide valve member 19 moves to put the chambers 16 and 17 in communication with each other (movement toward the right as viewed in FIG. 2).

The slide valve member 19 has at one of its ends (on the left side of FIG. 2) a flange 21 in which there is received a sealing element 22 which separates in a sealed manner the inlet chamber 17 from an annular counter-pressure chamber 23 which is connected by way of a pipe 24 to the measuring or detecting inlet 7 of the regulating device 1.

At its opposite end, the slide valve member 19 is integral with a coaxial ring which extends the valve member and on which a spring 26 bears, this spring moreover bearing against a plate 27 which is slidably mounted in the case 13. The plate 27 is provided with an orifice 28 which puts the inlet 7 in communication with a detecting chamber 29. The axial position of the plate 27 may be adjusted by means of an adjusting screw 30 so that it is possible to modify the stress of the spring 26 and thereby calibrate or set the regulating device.

The chamber 29 is separated in a sealed manner from the inlet chamber 17 by sealing means having a variable section or an annular flexible diaphragm 31 which surrounds the ring 25. The diaphragm has a circular bead 32, the end portion 34 of the diaphragm is pinched flat between the slide valve member 19 and the ring 25 and held fast by fixing screws 33. The bead 32 is engaged in an annular groove 35 defined by an inner annular flange 36 of the case 13 and a shaped ring 37 which is mounted to be coaxial with the case 13 and retained therein by a circlip 38.

The diaphragm 31 is mounted in the case 13 in such manner that a web thereof, located between the bead 32 and the end portion 34, is folded onto itself, a first portion 31a of the web marrying up with the inner wall of the ring 37, a second portion 31b of the web being applied against the outer wall of the ring 25. A third or intermediate portion 31c has, in the end region of the diaphragm 31, a toroidal shape the size of which may change in accordance with the displacements of the slide valve member 19. Indeed, the ring 37 has an inner wall which is cylindrical in the part 37a and then frustoconical in the part 37b, the latter part being divergent in the direction of the spring 26. Consequently, when the slide valve member 19 moves in the direction for compressing the spring (to the right as viewed in FIG. 2), the intermediate portion 31c of the diaphragm can develop or increase in size under the effect of the pressure prevailing in the inlet chamber 17 (see also FIG. 3).

The diaphragm 31 is made from a flexible material having very little elasticity, for example from a reinforced elastomeric material. A particularly suitable diaphragm is that manufactured by the firm "Le Joint Français" under the reference "BELLOFRAM" Class A.

The device just described operates in the following manner:

When the regulating device is in the situation shown in FIG. 2, there is a balance between the upstream pressure $P_1$ and downstream pressure $P_2$ so that $\Delta P = P_1 - P_2$.

The device is so designed that the value $\Delta P$ is maintained constant irrespective of the variations in the pressures $P_1$ and $P_2$.

In the event of a variation in one of these parameters, the slide valve member 19 is displaced axially and modifies the compression of the spring 26. The force exerted by the latter varies in accordance with its compression and the value $\Delta P$ would have an error which is a function of this variation in the force exerted. The arrangement just described compensates for this error in a simple manner owing to the presence of the diaphragm 31.

In the position shown in FIG. 2, the active surface of the diaphragm 31 on which the differential pressure acts, is:

$$(\pi D_1^2/4) - (\pi D^2/4) = ds_1$$

wherein:
$D_1$ = mean diameter of the median portion 31c of the diaphragm;
$D$ = outside diameter of the flange 21 of the slide valve member 19.

Figure 3:
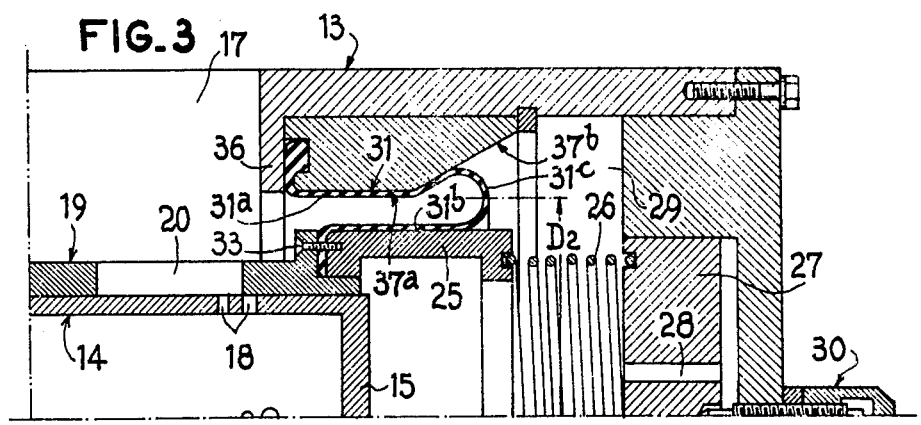
FIG. 3 is a partial view similar to FIG. 2 in respect of another position of the moving parts of the device according to the invention.

If the differential pressure $\Delta P$ is modified, the slide valve member 19 moves a distance $\Delta s$, for example to re-establish the pressure $\Delta P$ at its initial value. However, as a result of this, the active surface of the diaphragm 31 is modified so that for this displacement $\Delta s$ (FIG. 3)

$$(\pi D_2^2/4) - (\pi D^2/4) = ds_2$$

wherein $D_2$ is the new mean diameter of the median portion of the diaphragm as a result of the divergent surface 37b.

The variation in the force exerted by the spring is compensated for if $$(ds_2 - ds_1) \Delta P = \Delta s K = F_2 - F_1 = \Delta F$$

wherein:
$K$ = the constant of the spring;
$F_2$ = the force exerted by the spring after displacement;
$F_1$ = the force exerted by the spring before displacement.

Consequently, the variation in the force exerted by the spring 29 is accompanied by a variation in the active surface or area of the diaphragm 31 which tends to compensate for the error introduced.

In the illustrated embodiment, the variation in the force exerted by the spring is linear as a function of the displacement $\Delta s$. This is why, in the chosen embodiment, the surface 37b is frustoconical, which introduces a roughly linear variation in the active surface of the diaphragm 31 and consequently the value $\Delta P$ remains constant notwithstanding variations in the pressures $P_1$ and $P_2$.

When the slide valve member 19 moves, a more or less large amount of the flow of the fluid passes through the orifices 18. In the embodiment shown in FIG. 1, this amounts to a more or less large feed back of the fluid to the inlet side of the pump 5.

Note that the arrangement described hereinbefore provides a particular advantage owing to the fact that the downstream pressure $P_2$ is sent to the chamber 23 to act on the corresponding end face of the slide valve member 19. As a result of the application of this "counter pressure" there is a substantial reduction in the effective surface on which the differential pressure acts. Consequently, relatively, it is possible to employ a weaker spring while increasing the compensating effect of the diaphragm 31. Moreover, the precision of the regulation can thus be increased.

Figure 4:
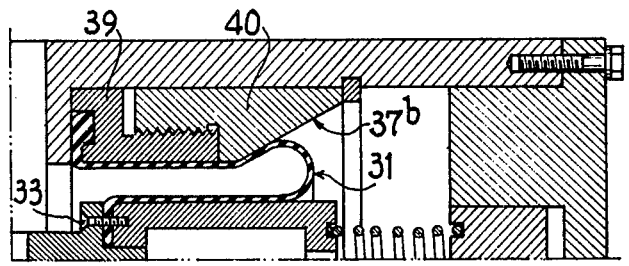

FIG. 4 shows a modification of the invention in which the shaped ring 37 is replaced by a ring 39 for securing the diaphragm 31 and by a shaped ring 40 which performs the function of the surface 37b shown in FIG. 2. The rings 39 and 40 have complementary screwthreads so that shaped rings can be easily interchanged if it is desired to employ, for the regulation, a spring having a different stiffness or if it is desired to impose a certain law of variation on the value $\Delta P$, instead of maintaining this value constant.

Thus, in the embodiments shown in FIGS. 2 to 4, the profile of the surface 37b, and the inclination of this surface with respect to the axis of the regulating device, are so chosen that the variation in the active surface of the diaphragm exactly compensate for the variation in the force exerted by the spring 26 in the course of the displacements of the slide valve member 19.

Figure 5:
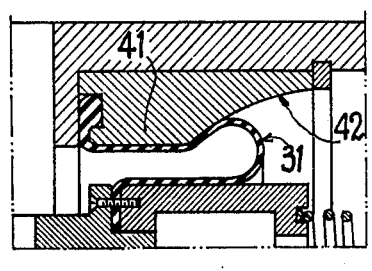

In the modification shown in FIG. 5, a ring 41 is provided which has an inner surface 42 which has a different profile in that it is divergent in the direction of the spring but is concave, as shown. Consequently, there is a law of variation of the value ΔP which is imposed by the shape of these surfaces.

Generally therefore, the invention imposes, merely by the choice of the shape of the inner surface of the ring, a certain law of variation of the value ΔP as a function of the displacements of the slide valve member 19 in opposition to the action of the spring 26. This particular feature of the invention renders the regulating device applicable in a large number of various applications in which a differential pressure must be regulated in accordance with the pressures composing it.

Thus FIGS. 6A and 6B show another modification of the regulating device respectively for two different positions of the slide valve member. In this embodiment, the ring 25 of the preceding embodiments is replaced by a ring 43 which has a frustoconical outer surface 44 whose section decreases in the direction of the end against which the spring 26 bears. The profiles of the rings 37 and 43 determine, by their cooperation, a law of variation of the differential pressure as a function of the displacement of the slide valve member 19.

FIG. 7 shows another embodiment of the invention which comprises means for avoiding difficulties which arise in the event of rupture of the diaphragm. Although the risk of rupture is low, these means may be desirable in order to increase the safety of operation, since, if a rupture occurred, all the orifices 18 would be closed by the action of the spring 26 and the value ΔP would become zero and there would no longer be any regulation.

For this purpose, the device shown in FIG. 7 comprises, instead of the ring 25, a sleeve 45 which is secured to the slide valve member 19 as before but which is extended axially and at the opposite end by a portion constituting a piston 46 which receives a sealing element 47 in an outer annular groove. This piston 46 cooperates with a coaxial ring 48 constituting a cylinder and retained in the case 13 by a circlip 49. The inside diameter of the cylinder 48 is equal to the mean diameter of the diaphragm 31. An annular chamber 50 is thus defined between the diaphragm 41 and the piston-cylinder assembly 46–48 and this chamber 50 communicates with the chamber 29 by way of a small radial orifice 51 formed in the sleeve 45.

In normal operation, this orifice 51 transmits the pressure $P_2$ of the chamber 29 to the chamber 50 and the regulation is effected in the same way as in the preceding embodiments. However, in the event of rupture of the diaphragm 31, a differential pressure is established between the two chambers owing to the calibrated orifice which then allows through a small flow. Operation can then be maintained under acceptable conditions.

Having now described my invention what I claim as new and desire to secure by Letters Patent is:

1. A device for regulating the differential pressure between two points of different pressure of a fluid circuit, comprising means defining a case, means defining an inlet orifice for the case for connection to the first point of pressure, means defining a fluid return orifice, and means defining a passage of a variable section interposed between said orifices, a slide valve member movably mounted in said case, a spring for biasing the valve member, the valve member being capable of regulating said passage as a function of the differential pressure of the two points of pressure in opposition to the action of the spring, means defining a detecting chamber in said case for connection to the second point of pressure, and a sealing means for separating the detecting chamber from said inlet orifice, the sealing means having a section which is capable of varying as a function of the displacement of said slide valve member and being exposed to said differential pressure, said device further comprising a counter-pressure chamber for being subjected to the pressure of said second point of pressure and communicating with said detecting chamber, whereby said sealing means alone is exposed to said differential pressure.

2. A device as claimed in claim 1, wherein said means of variable section comprises a diaphragm whose effective surface which is exposed to said differential pressure is capable of varying as a function of said displacement of said slide valve member.

3. A device as claimed in claim 2, comprising means defining an annular support surface coaxial with said slide valve member and in which device said diaphragm has an annular shape and comprises a first edge portion and a second edge portion and an intermediate web located between said edge portions, the diaphragm being secured on one of said edge portions to said slide valve member and on another of said edge portions to said casing and said web being folded upon itself, the folded web having a portion applied against said annular support surface which has a profile which varies in the axial direction.

4. A device as claimed in claim 2, wherein said diaphragm has a face facing said detecting chamber and separated from said detecting chamber by means comprising a piston-cylinder arrangement the piston of which arrangement is integral with said slide valve member and the cylinder of which arrangement is mounted to be fixed relative to said case, said arrangement defining with said diaphragm an annular chamber, a calibrated orifice putting said annular chamber in communication with said detecting chamber.

5. A device as claimed in claim 3, comprising a ring coaxially surrounding said slide valve member and defining said support surface of varying profile.

6. A device as claimed in claim 5, wherein said slide valve member defining a cylindrical surface and said folded web having another piston applied against the cylindrical surface of said slide valve member and said counter-pressure chamber is defined by a face of said slide valve member which has an outside diameter equal to the diameter of said cylindrical surface.

7. A device as claimed in claim 5, wherein said slide valve member defining a surface which has a profile which varies axially and said folded web has another portion applied against said surface of said slide valve member.

8. A device as claimed in claim 3, wherein the profile of said support surface is rectilinear.

9. A device as claimed in claim 3, wherein the profile of said support surface is curved.

10. A device as claimed in claim 1, wherein said differential pressure must be maintained constant and the variation in the section of said sealing means is capable of compensating for the variation of the force exerted by said spring as a function of the displacement of said slide valve member.

11. A fluid flow regulating device comprising a fluid pump, a variable-section fluid flow control device putting the pump in communication with means utilizing the fluid from said pump, and a device for regulating the differential pressure of a fluid circuit and means defining a case, means defining an inlet orifice for the case for connection to the first point of pressure, means defining a fluid return orifice, and means defining a passage of a variable section interposed between said orifices, a slide valve member movably mounted in said case, a spring for biasing the valve member, the valve member being capable of regulating said passage as a function of the differential pressure of the two points of pressure in opposition to the action of the spring, means defining a detecting chamber in said case for connection to the second point of pressure, and a sealing means for separating the detecting chamber from said inlet orifice, the sealing means having a section which is capable of varying as a function of the displacement of said slide valve member and being exposed to said differential pressure, said device for regulating the differential pressure further comprising a counter-pressure chamber for being subjected to the pressure of said second point of pressure and communicating with said detecting chamber, whereby said sealing means alone is exposed to said differential pressure, said points of pressure being formed respectively by an upstream side and a downstream side of said control device and said return orifice being connected to an inlet side of said pump.

12. A device for injecting fuel, in particular for turbomachines comprising a fuel flow regulating device comprising a fuel pump, a variable-section fuel flow control device putting the pump in communication with means utilizing the fuel from said pump, and a device for regulating the differential pressure of a fuel circuit and means defining a case, means defining an inlet orifice for the case for connection to the first point of pressure, means defining a fuel return orifice, and means defining a passage of a variable section interposed between said orifices, a slide valve member movably mounted in said case, a spring for biasing the valve member, the valve member being capable of regulating said passage as a function of the differential pressure of the two points of pressure in opposition to the action of the spring, means defining a detecting chamber in said case for connection to the second point of pressure, and a sealing means for separating the detecting chamber from said inlet orifice, the sealing means having a section which is capable of varying as a function of the displacement of said slide valve member and being exposed to said differential pressure, said device for regulating the differential pressure further comprising a counter-pressure chamber for being subjected to the pressure of said second point of pressure and communicating with said detecting chamber, whereby said sealing means alone is exposed to said differential pressure, said points of pressure being formed respectively by an upstream side and a downstream side of said control device and said return orifice being connected to an inlet side of said pump.

13. A device for regulating the differential pressure between two points of different pressure of a fluid circuit, comprising means defining a case, means defining an inlet orifice for the case for connection to the first point of pressure, means defining a fluid return orifice, and means defining a passage of a variable section interposed between said orifices, a slide valve member movably mounted in said case, a spring for biasing the valve member, the valve member being capable of regulating said passage as a function of the differential pressure of the two points of pressure in opposition to the action of the spring, means defining a detecting chamber in said case for connection to the second point of pressure, and a sealing means for separating the detecting chamber from said inlet orifice, the sealing means having a section which is capable of varying as a function of the displacement of said slide valve member and being exposed to said differential pressure, said means of variable section comprising a diaphragm whose effective surface which is exposed to said differential pressure is capable of varying as a function of said displacement of said slide valve member, said diaphragm having a face facing said detecting chamber and separated from said detecting chamber by means comprising a piston-cylinder arrangement the piston of which arrangement is integral with said slide valve member and the cylinder of which arrangement is mounted to be fixed relative to said case, said arrangement defining with said diaphragm an annular chamber, a calibrated orifice putting said annular chamber in communication with said detecting chamber.

* * * * *